United States Patent [19]
Premerlani et al.

[11] Patent Number: 5,230,075
[45] Date of Patent: Jul. 20, 1993

[54] DATABASE SHADOWING SYSTEM WITH DATA TAGS THAT SELECT AN OPERATION OF THE SAVE COMMAND

[75] Inventors: William J. Premerlani, Scotia; James E. Rumbaugh, Schenectady; Michael R. Blaha, Niskaguna, all of N.Y.

[73] Assignee: General Electric Company, Schenectady, N.Y.

[21] Appl. No.: 533,216

[22] Filed: Jun. 4, 1990

[51] Int. Cl.⁵ .................. G06F 15/40; G06F 7/10; G06F 13/00
[52] U.S. Cl. .................. 395/600; 395/425; 395/800; 364/DIG. 1; 364/282.1; 364/285; 364/261.2
[58] Field of Search .................. 364/200, 900, 300; 395/600, 800

[56] References Cited

U.S. PATENT DOCUMENTS

| | | | |
|---|---|---|---|
| 4,186,438 | 1/1980 | Bensen et al. | 364/200 |
| 4,558,413 | 12/1985 | Schmidt et al. | 364/300 |
| 4,648,036 | 3/1987 | Gallant | 364/300 |
| 4,654,819 | 3/1987 | Stiffler et al. | 395/425 |
| 4,714,992 | 12/1987 | Gladney et al. | 364/200 |
| 4,912,637 | 3/1990 | Sheedy et al. | 364/300 |
| 5,029,125 | 7/1991 | Sciupac | 395/600 |
| 5,133,075 | 7/1992 | Risch | 395/800 |

OTHER PUBLICATIONS

Gray et al., The Recovery Manager of the System R Database Manager, Computing Surveys, vol. 13, No. 2, Jun. 1981, pp. 223-242.

Premerlani et al., "Building An Object-Oriented Database on Top of a Relational Database", to be published in the Sep., 1990 edition of ACM.

"An Introduction to Database Systems", C. J. Date, 4th Edition, vol. 1, 1986, pp. 413-419, Addison-Wesley Publishing Co., Reading, Mass.

Primary Examiner—Thomas C. Lee
Assistant Examiner—Wayne Amsbury
Attorney, Agent, or Firm—Gene Bolmarcich; Paul Webb, II

[57] ABSTRACT

A database shadowing system for performing data checkout/checkin operations. The system includes performing the steps of 1) identifying a data item stored in a database for editing, 2) copying the data item from the database to an active memory file thereby creating an active memory copy of the data item, 3) associating a tag with the active memory copy of the data item, changing a state of the data item 4) tag depending upon the edit operation performed on the active memory copy of the data item, and 5) saving any change made to the active memory copy of the data item by making the change to the database data item upon issuance of a save command, command so that the data item tag of the active memory copy of the data item controls the manner of changing the database data item.

6 Claims, 5 Drawing Sheets

DATABASE SHADOWING SYSTEM WITH DATA TAGS THAT SELECT AN OPERATION OF THE SAVE COMMAND

The present invention relates to database systems, and more specifically, relates to performing edit operations, such as updating, inserting and deleting, on data stored in a database.

BACKGROUND OF THE INVENTION

In performing editing operations on data stored within a memory unit, i.e., a database, and to increase the speed at which such changes may be made, a database checkout procedure may be utilized. In a database checkout procedure, a portion of the data, e.g., a file, from the database is locked for exclusive use and copied into a random access memory, i.e., a RAM. Subsequent read and write operations are then executed against the RAM copy. Once the edit operation is finished, the edited version of the data is checked back into the database and made available for general use. The older version of the data is removed, e.g., erased, from the memory unit or may be saved. This checkout/checkin procedure is referred to herein as database shadowing.

In database shadowing systems, it is preferred that access to data be fast and that changes and/or additions to the data within the database be reflected in a timely manner. Also, consistency, or at least identifiability, between edited versions of data is important. Otherwise, a user may not know which version of data is most current and usable.

It is therefore an object of the present invention to provide a database shadowing system which increases the access speed to data and reduces time required to make changes and/or additions to such data.

Another object of the present invention is to provide a database shadowing system which facilitates consistency between versions of edited data stored in a memory unit.

SUMMARY OF THE INVENTION

The present invention provides high speed access to stored data which forms part of a database by providing an in-memory copy of selected items from the database. Specifically, at the start of an editing session, all required data is read in from the database and stored as an "in-memory", i.e., an active memory, copy in a RAM. As each item is read in, a tag marked "PERSISTENT" is associated with each item. Initially, all data items placed in active memory are marked "PERSISTENT". During a course of an editing session, the tags of each data item may be changed to reflect the operation to be performed upon the corresponding data item stored in the database.

More particularly, during the edit session, and depending upon a present state of a tag associated with a data item and a requested operation, the tag of an item may be changed to another state and certain actions taken. When it is desired to save the accumulated changes to the database, the tag associated with each data item is utilized to determine how the changes are to be effected upon each corresponding data item stored within the database. For example, items marked "INSERT" are inserted into the database, items marked "DELETE" result in deleting the corresponding item from the database, and items marked "UPDATE" result in updating corresponding data items.

Saving the edited version may occur under a number of conditions. For example, one condition is that the user requests the edit version to become permanent. Another condition is when a certain total number of items have been marked for database updating. Specifically, a threshold can be set by a user so that when a number of changes just above the threshold number of changes occur, the changes are reflected in the database.

The present shadowing system also intercepts errors which may occur during the editing session and reflects these errors to the system user. This assures that updating the database will occur properly and avoids potential errors at the time of saving the changes.

The present database shadowing system increases the access speed to data and reduces the time required to make changes and/or additions to such data. For example, the present shadowing system, which may be computer-implemented in a programming language, provides that it is easier for an application to access data by integrating database access with a programming language. The present system also facilitates consistency between versions of edited data and stored data.

BRIEF DESCRIPTION OF THE DRAWINGS

These and other objects of the present invention, together with further features and advantages thereof, will become apparent from the following detailed specification when read together with the accompanying drawings, in which.

DETAILED DESCRIPTION OF THE DRAWINGS

Figure 1:
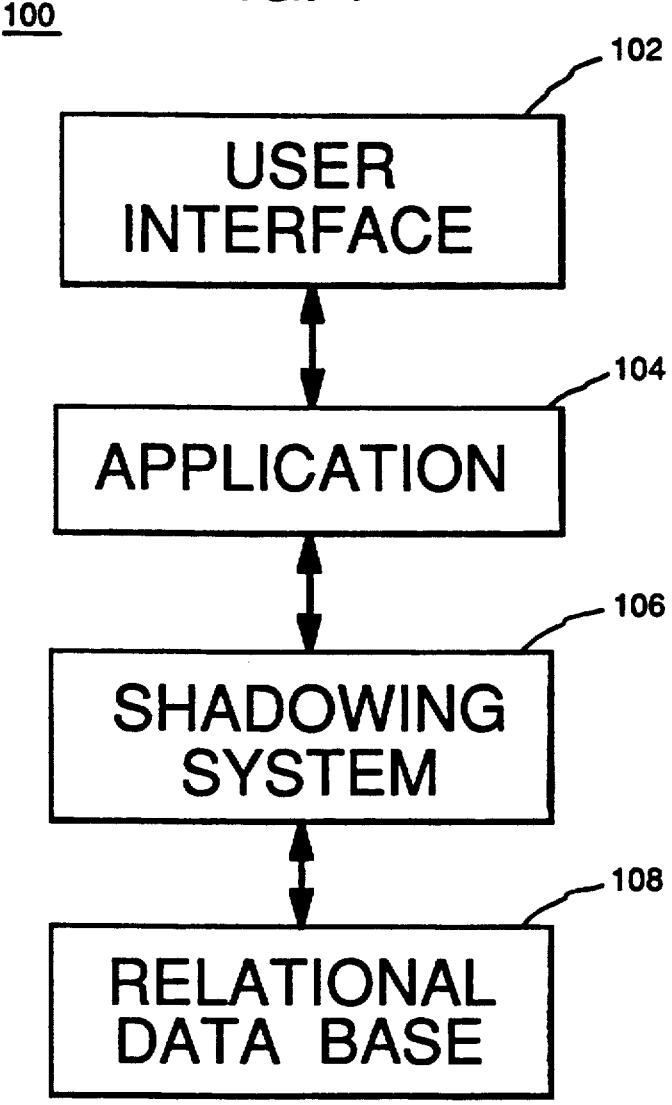
FIG. 1 is a high level block diagram illustrating a computer system including the present shadowing system.

Referring now more particularly to the drawings, FIG. 1 illustrates a system 100 which includes a user interface 102, an application 104, a shadowing system 106 in accordance with the present invention and a database 108. As illustrated in FIG. 1, communications occur between user interface 102 and application 104. Application 104 may be one of many computer-implemented methods expressed in a programming language. Communications also occur between application 104 and shadowing system 106. It is contemplated that the application could access database 108 directly rather than only through the present shadowing system. Although the shadowing system forms a layer between the database and application, a system user need not be aware of the fact that communication from the application is actually occuring through the shadowing system rather than directly with the database. When writing an application, however, it is contemplated the writer can provide instructions to access data directly by bypassing the shadowing system or access data indirectly through the shadowing system. Database 108 is indicated as being a relational database, however, the present invention is not limited to such a database. It is contemplated that any database could be utilized.

In operation of the system shown in FIG. 1, and briefly, when a system user desires to edit information stored within the database, the user enters an edit command at interface 102. As known in the art, the edit command provides an indication as to the data or block of data to be edited. The edit command is intercepted by the shadowing system. The data to be operated upon, which is initially stored in the database, is copied from the database to the shadowing system. The copied data may be stored in any block of memory designated by the shadowing system.

The user then performs edit operations upon the copy of data rather than directly operating upon the data within database 108. As discussed in more detail hereinafter, during the edit operation, tags are associated with each data item. When the changes are complete, the system user indicates, for example, that the changes are to be saved. The shadowing system then operates upon the data stored in the database to make changes in accordance with the state of the tag associated with each corresponding data item in the RAM copy.

Figure 2A:
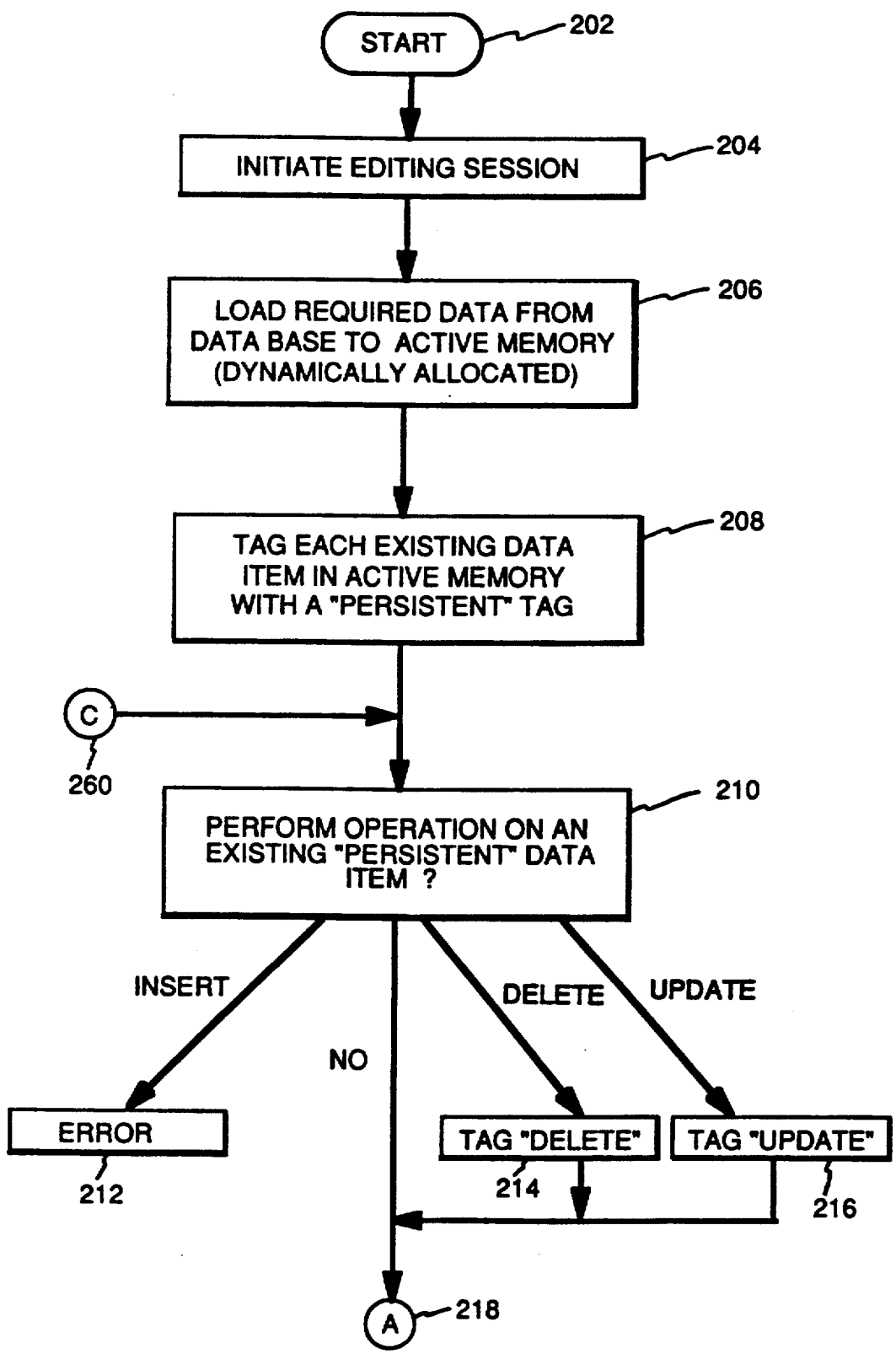
FIGS. 2A-C illustrate a sequence of method steps performed by the present shadowing system.
Figure 2B:
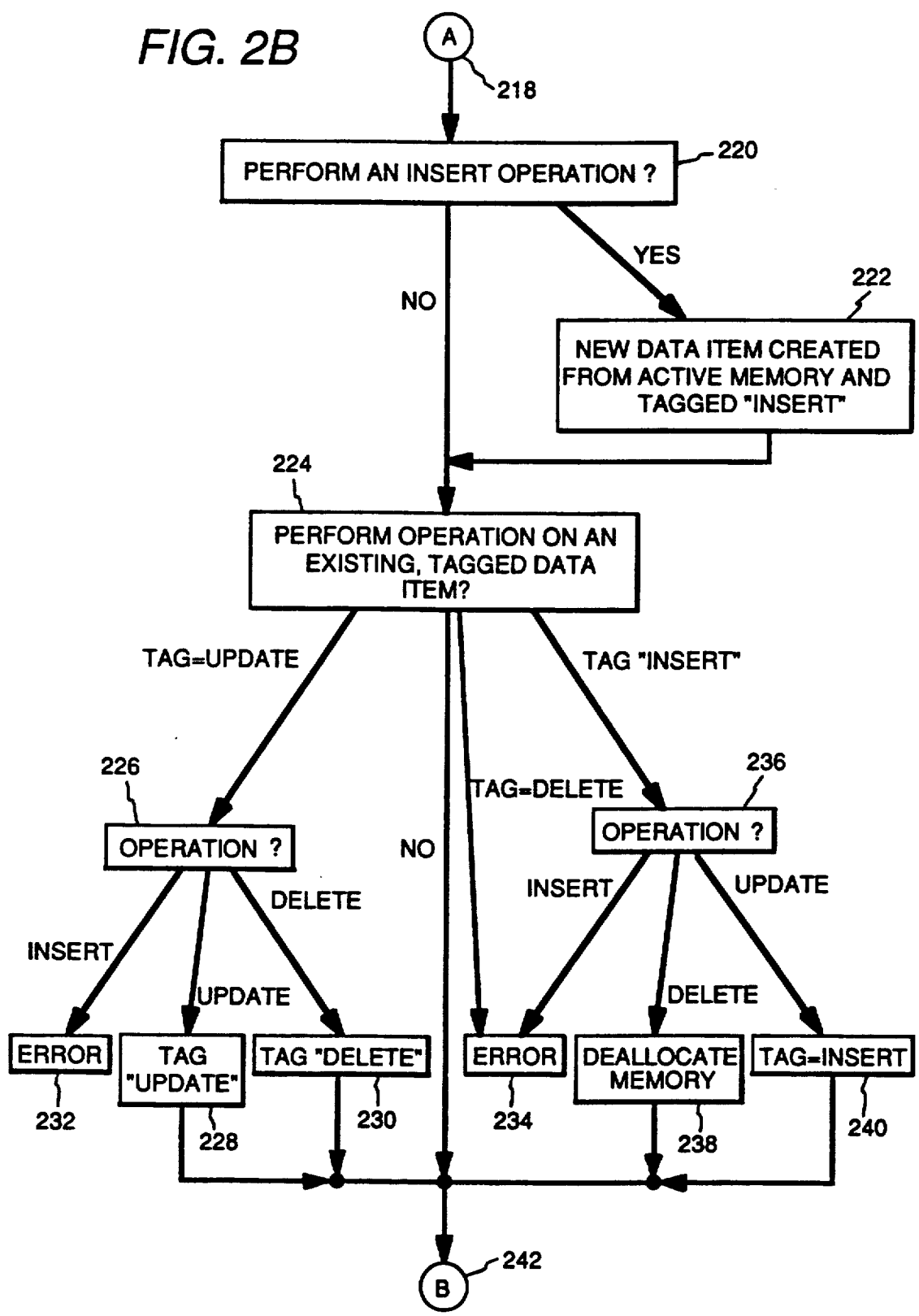
Figure 2C:
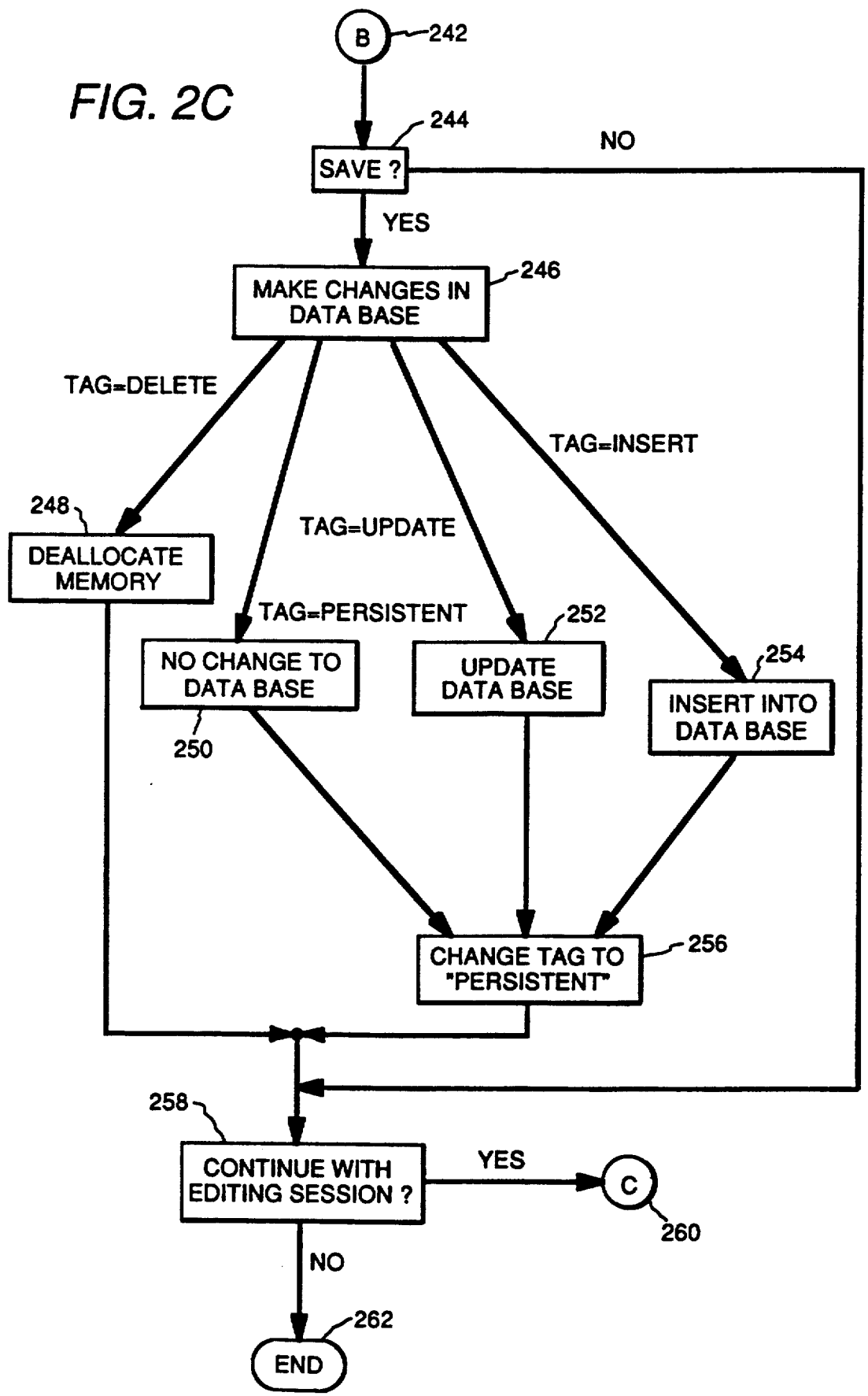

FIGS. 2A-C illustrate, in more detail, a sequence of method steps in accordance with the present shadowing system. More particularly, once operations have begun as indicated at a start step 202, a system user must initiate an editing session as indicated at a step 204. The term system user as used herein may refer to a human user, a computer, or any system capable of interacting with the shadowing system. To initiate an editing session, for example, a user typically designates the specific data item or block of data items to be operated upon. The indicated data is then copied, i.e., loaded from the database, to active memory which is dynamically allocated within the shadowing system. This procedure is indicated as step 206. As data is loaded from the database to active memory, and as shown at a step 208, each existing data item being allocated to active memory is tagged with a "PERSISTENT" tag. The term "PERSISTENT" as used herein refers to un-updated, e.g., unmodified, persistent data items. Each data item copied from the database is initially tagged "PERSISTENT".

Once each data item has been copied into active memory, a user determines whether an operation is to be performed on an existing persistent data item as indicated at a step 210. As illustrated in FIG. 2A, an "INSERT" operation cannot be performed on a data item tagged "PERSISTENT". As indicated at step 212, if a user attempts to perform an insert operation on a persistent data item, an error message will be provided, e.g., displayed, to the user.

The user may perform a "DELETE" operation or a "UPDATE" operation on existing data items tagged "PERSISTENT". If a "DELETE" or "UPDATE" operation is performed, the data item will be tagged "DELETE" or tagged "UPDATE", respectfully, as indicated at steps 214 and 216, respectively. Once the data item is tagged "DELETE" or "UPDATE", or if no operation is to be performed on an existing "PERSISTENT" data item, operations continue as indicated by a continue legend "A" 218 to operations shown in FIG. 2B.

As illustrated in FIG. 2B, a user may select to perform an insert operation as indicated at step 220. If an insert operation is to be performed, a new data item is created from active memory and tagged "INSERT" as indicated at step 222. More particularly, memory space is allocated from the active memory for the new data item. Once the new data item is created and tagged "INSERT", or if the user determines not to perform an insert operation, the system user may then select to perform an operation on an existing tagged data item as indicated at step 224.

At step 224, a data item is considered to be tagged if its tag is equal to "UPDATE", "DELETE", or "INSERT". If an operation is to be performed upon a data item tagged "PERSISTENT", then the operation would be performed as indicated at step 216 as hereinbefore discussed. If the tag of the existing data item to be edited is "UPDATE", the user then selects a specific operation to be performed as indicated at step 226. Specifically, the user may select to perform an "INSERT", an "UPDATE" or a "DELETE" of the existing data item tagged "UPDATE". If "UPDATE" or "DELETE" is selected, the data item is tagged "UPDATE" or "DELETE", respectively, as indicated at steps 228 and 230, respectively. If the user selects "INSERT", however, an error message will be displayed to the user as indicated at step 232. If the user desires to perform an operation on a data item tagged "DELETE", an error message will be displayed as indicated at step 234.

If a user desires to perform an operation on a data item tagged "INSERT", the user may then select to perform an "INSERT", "DELETE" or "UPDATE" operation as indicated at step 236. If the user determines to perform an "INSERT" operation on a data item tagged "INSERT", an error message will be displayed as indicated at step 234. If the user selects to perform a "DELETE" operation on a data item tagged "INSERT", the memory space previously allocated during the insert operation will be deallocated as indicated at step 238. If the user updates the data item tagged "INSERT", the tag for the data item will remain equal to "INSERT" as indicated at step 240 and the item may be updated in accordance with the user determined specification. From these operations, operations continue as indicated at a continue legend "B" 242 to operations shown in FIG. 2C.

As shown in FIG. 2C, a next step is for a user to determine whether a "SAVE" operation 244 is to be performed. If a "SAVE" operation is to be performed, then changes are made to the data stored in the database as indicated at step 246. Specifically, in the "SAVE" procedure, if a data item is tagged "DELETE", memory space associated with that data item is deallocated as indicated at step 248. If a data item tag equals "PERSISTENT", then for that data item, no change is made to the corresponding data item stored in the database as indicated at step 250. If a data item is tagged "UPDATE", such updates are made to that corresponding data item in the database as indicated at step 252. If a data item is tagged "INSERT", then that data item is inserted into the database as shown in step 254. Once the updates, insertions and deletions are made within the database, the tag on each data item is changed to "PERSISTENT" as indicated at step 256.

If no save operation is to occur or once the save operation is complete, the system user may then determine whether to continue with the editing session as indicated at step 258. If the editing session is to continue, then as indicated at a legend "C" 260, operations return to step 210 shown in FIG. 2A. If the editing session is not to continue, then operations are completed as indicated at an end legend 262.

Although the above operations are illustrated as being performed sequentially, these operations could be performed in parallel or in any sequential order. The present invention is not to be limited to the sequential order specifically shown in FIGS. 2A-2C. Further, as previously mentioned, rather than having a system user explicity indicate whether a save operation is to occur, a threshold may be set so that when a predetermined number of changes have been made, the changes reflected up to that point are then made in the database. In this manner, in case of power failure or some other event where changes may be lost, changes which were made up to the last time the threshold was exceeded will be saved within the database thereby eliminating a need to completely restart the editing session in the event of such failure.

As also indicated in FIGS. 2A-C, the present system provides an indication to a system user when certain errors have been made during an editing session. In this manner, errors can be detected during the editing session and proper changes may be made to avoid such errors. Changes to the data items stored in the database can then be performed in a substantially error-free manner.

Figure 3:
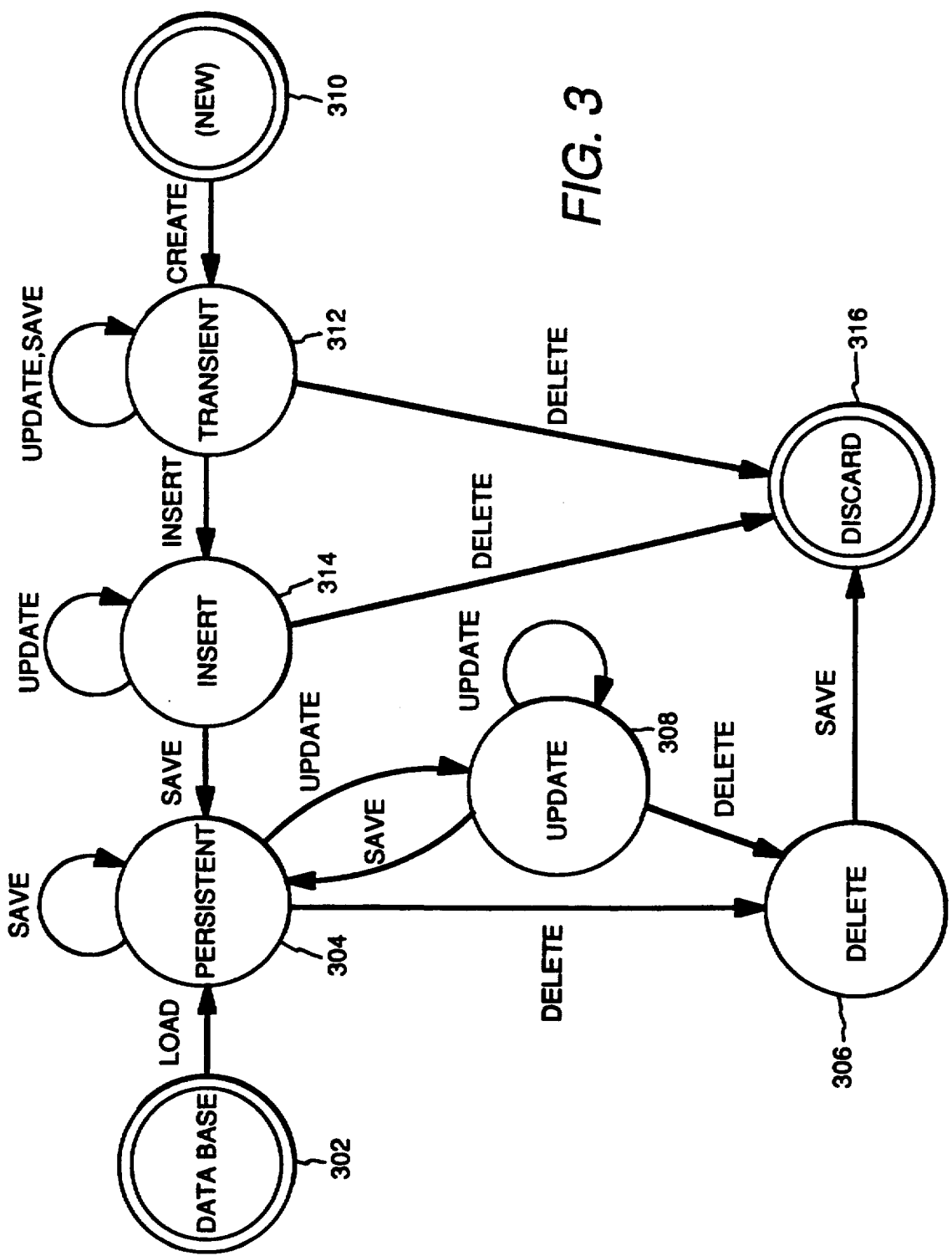
FIG. 3 is a state diagram which illustrates possible data item states.

FIG. 3 is a state diagram which illustrates the various states which items may be in during the editing session and state transitions. More particularly, a database as indicated at 302 may contain a plurality of data items which may be loaded, i.e., copied, into active memory. Each loaded data item is initially tagged "PERSISTENT" 304. The tag of persistent data items may be changed to "DELETE" 306 which indicates that the persistent data item is to be deleted from the database. A persistent data item may also have its tag changed to an "UPDATE" 308 which refers to persistent data items which have been updated since being loaded into the shadowing system. Free memory within the shadowing system is indicated as (new) space 310. If a new data item is to be created, the data item is tagged "TRANSIENT" as indicated at 312 and if it is determined that the transient tagged item is to be inserted into the database, the transient tag is changed to "INSERT" as indicated at 314. If the transient or insert tagged data items are to be deleted, the data items simply are discarded as indicated at 316.

During a save operation, items tagged "DELETE" are discarded. Items tagged "TRANSIENT" remain tagged "TRANSIENT". Items tagged "UPDATE" and "INSERT" are updated or inserted, respectively, into the database and their tags are changed to "PERSISTENT".

If an update operation is performed, data items tagged "TRANSIENT" remain tagged "TRANSIENT", items tagged "INSERT" remain tagged "INSERT", and items tagged "PERSISTENT" are tagged "UPDATE". It should be understood, therefore, that an update operation has the effect of changing items tagged "PERSISTENT" to "UPDATE". A subsequent save operation will result in updating the corresponding data items in the database.

The state diagram in FIG. 3 is similar to the flow diagram illustrated in FIG. 2. However, the state diagram illustrates another embodiment of the present invention which includes a transient tag which may be associated with some data items.

The present invention provides fast access to data by allowing editing sessions to occur in active memory rather than through a database system. Further, the present invention facilitates consistency between the active memory copy and database by providing save operations which may occur automatically, i.e., threshold, and/or upon receipt of a save command. Also, the present invention facilitates reducing the time required to perform edit operations. For example, if a data item is inserted but later deleted during a same edit session and before a save operation, the database version of the data is never changed, i.e., the item is not inserted and then deleted from the database version. Further, only the necessary changes are reflected in the database version during a save operation, i.e., only items tagged insert, update and delete in the active memory affect corresponding items in the database version. Unedited data items, i.e., data items tagged "PERSISTENT", do not affect their counterparts stored in the database. If only one data item is edited, for example, then only the corresponding data item in the database version is affected rather than copying all the data items from active memory to the database.

While a preferred embodiment has been illustrated and described herein, it will be apparent that numerous updates, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. An apparatus comprising:
   (a) means for identifying a data item stored in a database for editing;
   (b) means for copying the data item from the database to an active memory file thereby creating an active memory copy of the data item;
   (c) means for associating a tag with the active memory copy of the data item, said tag denoting a specific action to be taken with respect to said data item upon issuance of a save command;
   (d) means for changing a state of the data item tag in accordance with an edit operation performed on the active memory copy of the data item; and
   (e) means for saving any change made to the active memory copy of the data item by making the change to the database data item upon issuance of a save command, the state of the data item tag of the active memory copy of the data item selectively controlling the manner of changing the database data item.

2. An apparatus in accordance with claim 1 wherein issuance of a save command originates from a system user.

3. An apparatus in accordance with claim 1 wherein issuance of a save command orginates from an application program.

4. An apparatus in accordance with claim 1 further comprising means for a human system user to identify the data item stored in the database for editing.

5. An apparatus comprising:
   (a) means for identifying a data item stored in a database for editing;
   (b) means for copying the data item from the database to an active memory file thereby creating an active memory copy of the data item;
   (c) means for associating a tag with the active memory copy of the data item wherein tags which may be associated with data items include PERSISTENT, INSERT, and DELETE by tags;
   (d) means for changing a state of the data item tag depending upon the edit operation performed on the active memory copy of the data item; and
   (e) means for saving any change made to the active memory copy of the data item by making the change to the database data item upon issuance of a save command, the state of the data item tag of the active memory copy of the data item selectively controlling the manner of changing the database data item.

6. An apparatus in accordance with claim 5 further comprising means for automatically issuing the save command once a predetermined number of changes have been made.

* * * * *